United States Patent [19]

Berle et al.

[11] Patent Number: 4,721,009

[45] Date of Patent: Jan. 26, 1988

[54] GEAR WHEEL SHAFT ASSEMBLY

[75] Inventors: Axel G. Berle, Geel; Björn S. J. Fredeus, Berchen, both of Belgium

[73] Assignee: Atlas Copco Aktiebolag, Nacka, Sweden

[21] Appl. No.: 377,616

[22] Filed: May 13, 1982

[30] Foreign Application Priority Data

Jul. 15, 1981 [SE] Sweden ............................ 8104377

[51] Int. Cl.$^4$ .................. F16H 33/00; F16H 1/12; F16H 1/20
[52] U.S. Cl. .................. 74/640; 74/421 A; 403/259; 464/45
[58] Field of Search ............... 74/640, 421 R, 421 A; 464/45, 46, 30; 403/259

[56] References Cited

U.S. PATENT DOCUMENTS

| 1,066,648 | 7/1913 | Palmros | 74/421 A |
| 2,173,339 | 9/1939 | Myers | 74/421 A |
| 2,905,010 | 9/1959 | Riesler | 74/421 A |
| 2,908,180 | 10/1959 | Swenson | 74/421 A |
| 3,153,158 | 10/1964 | Schmitter | 74/421 A |
| 3,347,110 | 10/1967 | Wilson | 403/259 X |
| 3,874,722 | 4/1975 | Pickles | 74/421 R |

Primary Examiner—Leslie Braun
Attorney, Agent, or Firm—Eric Y. Munson

[57] ABSTRACT

A gear wheel shaft assembly in which the gear wheel (4) is pressed against an end plane (8) of a shaft (1) by a central bolt (5) through the gear wheel. The end plane is situated at a smaller radius than a shaft bearing (2). The cooperating surfaces (8,9) may be sand blasted.

3 Claims, 1 Drawing Figure

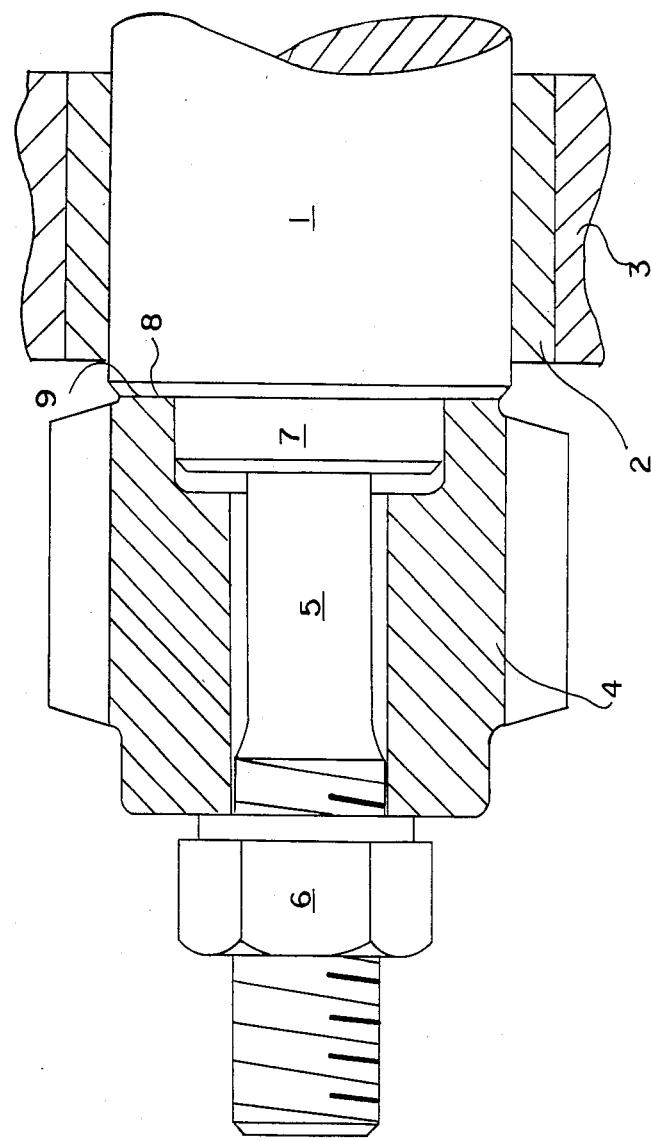

GEAR WHEEL SHAFT ASSEMBLY

The present invention relates to a gear wheel shaft assembly, particularly for driving rotary machines, e.g. screw compressors, at speeds exceeding the speed of the driving motor.

The optimum speed of a rotary machine normally deviates from the speed of the driving motor. One way of obtaining the desired speed is to use gear wheels between the driving motor and the driven shaft. The gear wheel on the driven shaft is then pushed onto the shaft and locked by means of a key or a conical device in order to transfer torque from the gear wheel to the shaft. Furthermore, in order to keep down deflections in the shaft it is desirable to make the shaft stiff, i.e. to use a large diameter. Since, according to prior art, the driven gear wheel is mounted around the shaft end the diameter of the gear wheel becomes fairly large. This is a drawback particularly in those cases where the shaft is to be driven with a higher speed than the driving motor. The reason is that the driving gear wheel becomes quite big because the ratio of the gear wheel diameters is inversely proportional to the ratio of the speeds.

The object of the present invention is to create a gear wheel shaft assembly making possible the use of large diameter shafts with small gear wheels.

The above object is met with an assembly as defined by the appended claims.

The advantages obtained are the possibility of using a gear wheel having a smaller diameter than the shaft, or being slightly larger yet sufficiently strong. It is also possible to use shorter shafts, thereby saving material. Since the transverse force transferred from the gear to the shaft can be applied to the shaft closer to the shaft bearing lower stresses are obtained in the shaft. Furthermore, the gear wheel can be given a large cross-sectional area, whereby the strength of the gear wheel can be kept high without increasing the diameter.

An embodiment of the invention is described below with reference to the accompanying drawing which shows a gear wheel shaft assembly according to the invention.

BRIEF DESCRIPTION OF THE DRAWING

The FIGURE is a fragmentary sectional view of a gear wheel and drive shaft assembly embodying the invention.

The embodiment shown in the drawing comprises a shaft 1 mounted for rotation in a bearing 2 in a housing 3. The shaft is provided with a hub member for a gear wheel 4. Radially outside the hub member the shaft is provided with an annular friction surface 8 against which the gear wheel is pressed by an axle bolt 5 and nut 6 either directly as shown or via a shim. The friction surface 8 is situated at a smaller radius than said bearing 2. The axle bolt is screwed into a central hole, not shown, in the shaft. In order to improve the torque transferring capacity, if desired, either surface 9 on the gear wheel or end plane 8 or both may be sand blasted. If a shim is used this may be sand blasted instead.

When the gear wheel 4 is mounted the following procedure is followed. The gear wheel is pushed onto the hub member 7. The nut 6 is screwed onto the bolt 5. Then a hydraulic tool, not shown, is screwed onto the bolt until it abuts the gear wheel. Hydraulic pressure is applied to tension the bolt. Then the nut 6 is screwed down until it abuts the gear wheel. The hydraulic tool is then depressurized. The advantages obtained with this mounting technique are a well defined bolt force, less problems with bolt strength since there is no torsion, a well defined stress in the material and minimized bending stress because of the central location.

What is claimed is:

1. A gear wheel and drive shaft assembly for a motor comprising a gear wheel (4) driven by said motor for transmitting torque to a drive shaft (1) which is journalled in a bearing (2), a reduced diameter hub member projecting from one end of said drive shaft and defining an annular peripheral friction surface (8) on said drive shaft (1), an axle bolt (5) of reduced diameter extending from said hub member, said gear wheel having an open-ended central bore permitting slidable engagement between said gear wheel and said axle bolt, said bore terminating at one open end in an enlarged recess fitting snugly about said hub member and permitting frictional engagement between said gear wheel and said annular friction surface, said axle bolt extending beyond the other open end of said central bore and being provided with means (6) for forcing and retaining said gear wheel in positive frictional drive contact with said annular friction surface.

2. A gear wheel and drive shaft assembly according to claim 1, in which said gear wheel (4) is provided with an annular peripheral friction surface (9) defined by said enlarged recess and facing said annular peripheral friction surface (8) on said drive shaft.

3. A gear wheel and drive assembly according to claims 1 or 2, in which said annular peripheral friction surfaces describe a circle having a radius which is shorter than the radius of said bearing (2).

* * * * *